No. 617,676. Patented Jan. 10, 1899.
E. EGGERT.
EYEGLASS GUARD.
(Application filed Jan. 8, 1898.)
(No Model.)
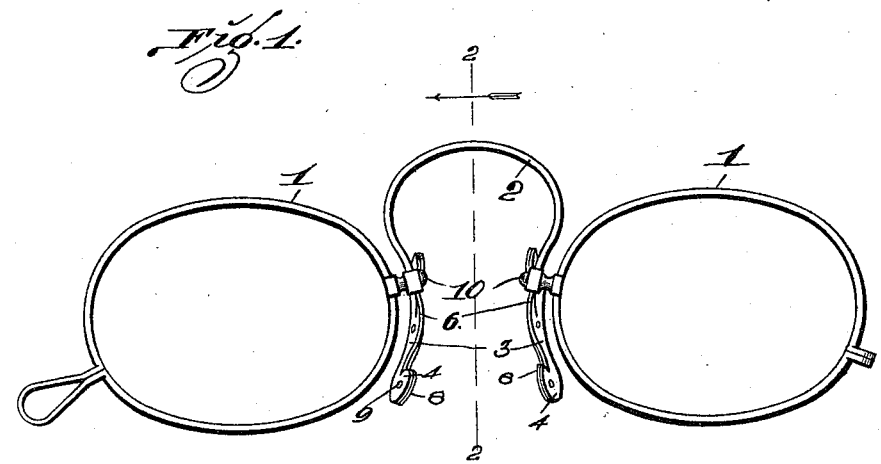
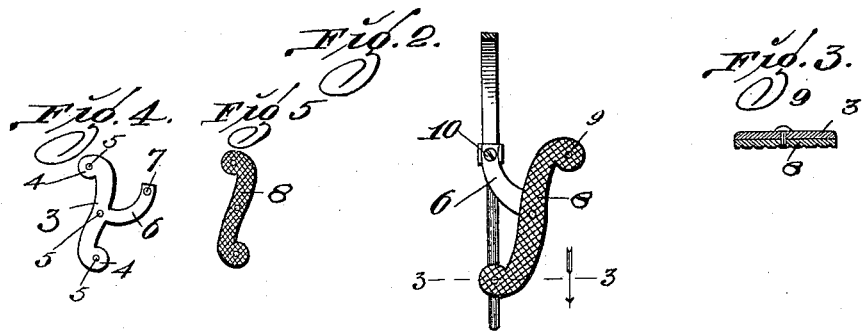
Attest:
M. P. Smith,
A. J. McCauley.
Inventor:—
Ernest Eggert:—
By Higdon, Longan & Higdon
Atty's

UNITED STATES PATENT OFFICE.

ERNEST EGGERT, OF ST. LOUIS, MISSOURI.

EYEGLASS-GUARD.

SPECIFICATION forming part of Letters Patent No. 617,676, dated January 10, 1899.

Application filed January 8, 1898. Serial No. 666,078. (No model.)

*To all whom it may concern:*

Be it known that I, ERNEST EGGERT, of the city of St. Louis, State of Missouri, have invented certain new and useful Improvements in Eyeglass-Guards, of which the following is a full, clear, and exact description, reference being had to the accompanying drawings, forming a part thereof.

My invention relates to eyeglass-guards; and it consists in the novel construction and arrangement of parts hereinafter described and claimed, and illustrated in the accompanying drawings, in which—

Figure 1 is a front elevation of a pair of ordinary eyeglasses, the same being fitted with a pair of my improved guards. Fig. 2 is a vertical sectional view taken approximately on the indicated line 2 2 of Fig. 1. Fig. 3 is an enlarged horizontal sectional view taken approximately on the indicated line 3 3 of Fig. 2. Fig. 4 is a side elevation of the base-plate of one of my improved guards. Fig. 5 is an elevation of the facing that is located upon the base-plate seen in Fig. 4. Figs. 6, 7, 8, and 9 are elevations of different forms of the base-plate I make use of.

Referring by numerals to the accompanying drawings, 1 1 indicate the frames of a pair of eyeglasses, the same being of the usual form and construction and connected by the usual resilient bow 2.

My improved guard consists of the thin metallic plate 3, which is in the form of a compound curve and provided on each end with an integral semicircular projection 4. In each end and in the center of this plate are formed suitable rivet-holes 5. This base-plate may be likened to an elongated letter "S," and formed integral with and extending outwardly and upwardly from one side of said base-plate is a curved arm 6, in the upper end of which is an aperture 7.

A facing 8, of suitable material—such as celluloid, horn, or shell—and having a corrugated face, is constructed of the same form and size as is the base-plate 3, and said facing 8 is located upon one side of said plate 3 and fastened thereto by means of suitable rivets 9.

The guards constructed as just described are made in rights and lefts, and a pair of said guards is fixed to a pair of eyeglasses by locating the upper ends of the curved arms 6 in the clips that connect the frames 1 of the glasses to the bow 2 and passing the screws 10, that secure said bow 2 to the frames 1, through the apertures 7 in said arms 6. When a pair of guards is so located upon a pair of eyeglasses, the upper ends of said pair of guards lie in a plane some little distance from the vertical plane occupied by the frames and bow of said glasses, while the lower ends of said pair of guards lie in direct alinement with the pair of frames. After the guards have been located upon the glasses the base-plate 3, being of metal, can be bent so as to conform to the contour of the nose of the person on whom the glasses are fitted, and the facings 8, being of celluloid, horn, or analogous material, will readily bend with said base-plates and remain in such bent positions. When such a pair of guards is located upon a pair of eyeglasses and said glasses are properly fitted to the eyes, the upper ends of the base-plates 3 or the pair of semicircular projections 4 will lie directly in alinement with and in front of the inner corners of the eye and the body portion of said guards or the lower ends thereof will extend downwardly on each side of the upper portion of the nose, and as said guards occupy a comparatively large surface upon the nose the glasses will be very rigidly held in proper position and will not easily become dislocated or out of position.

There is a very great advantage gained by making the guards in the shape of an elongated "S," as by so doing said guards can be much more easily fitted to the nose, and consequently the glasses on which said guards are located can be much more correctly fitted to the eyes.

The base-plates of said guards are all of the same shape, the arms 6 only differing the one from the other in shape, length, and angle of projection.

Said guards are very light, comparatively inexpensive, very easily adjusted, and are very efficient in use.

I claim—

As an article of manufacture, an eyeglass guard constructed of a compound curved base-plate, semicircular plates formed integral with each end of said base-plate, a curved arm formed integral with, and extending laterally from, said base-plate, and a detachable flexible facing for said base-plate, substantially as specified.

In testimony whereof I affix my signature in presence of two witnesses.

ERNEST EGGERT.

Witnesses:
EDWARD E. LONGAN,
ALBERT J. McCAULEY.